Oct. 26, 1954     T. A. OVERBY ET AL     2,692,579
STOCK WATERING TROUGH
Filed July 7, 1953     2 Sheets-Sheet 1
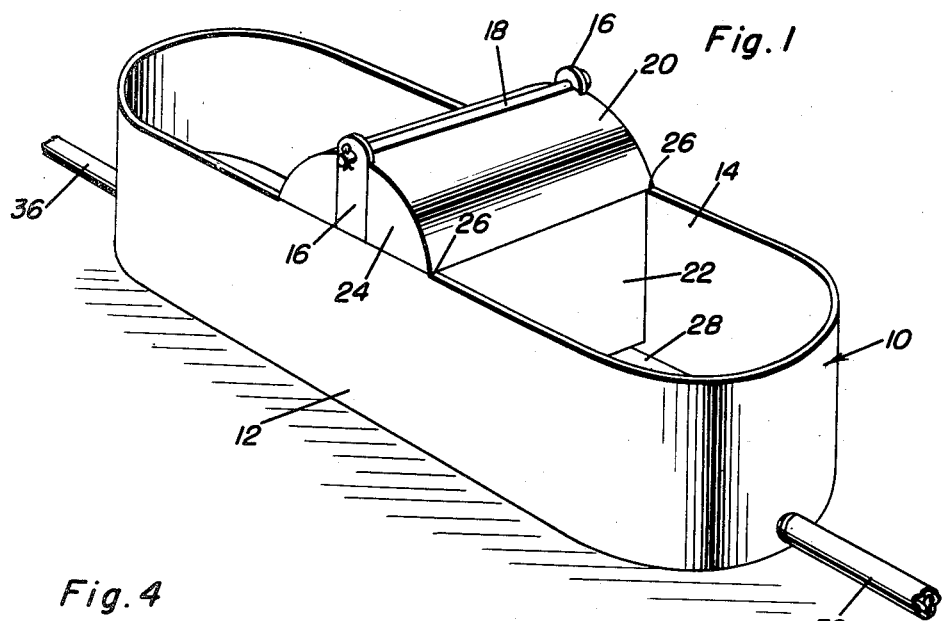
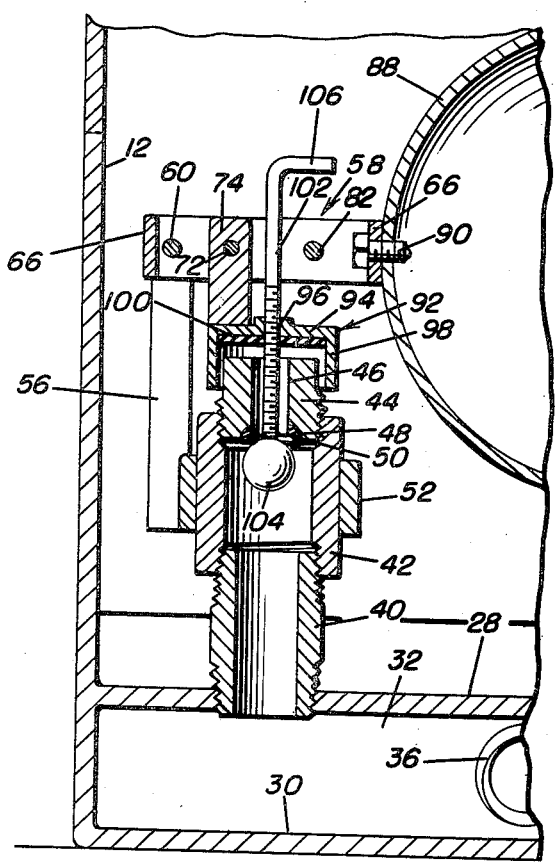
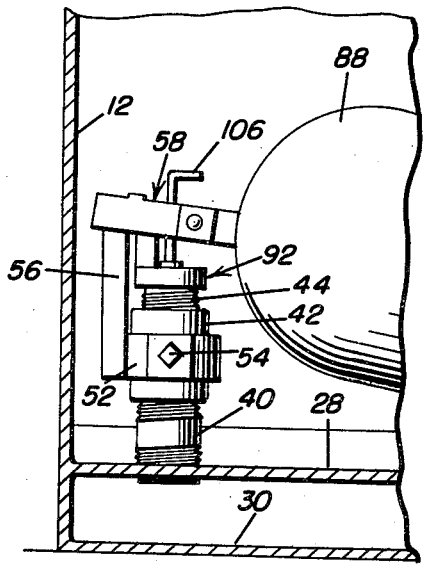
Theodore A. Overby
John G. Overby
          INVENTORS.
BY *Clarence A. O'Brien*
*and Harvey B. Jacobson*
                      *Attorneys*

Oct. 26, 1954  T. A. OVERBY ET AL  2,692,579
STOCK WATERING TROUGH
Filed July 7, 1953  2 Sheets-Sheet 2

Theodore A. Overby
John G. Overby
INVENTORS.

BY *Clarence A. O'Brien*
*and Harvey B. Jackson*
Attorneys

Patented Oct. 26, 1954

2,692,579

UNITED STATES PATENT OFFICE 2,692,579

STOCK WATERING TROUGH

Theodore A. Overby and John G. Overby, Aberdeen, S. Dak.

Application July 7, 1953, Serial No. 366,578

6 Claims. (Cl. 119—73)

This invention relates generally to accessories for livestock and pertains more particularly to a novel and improved form of water trough therefor.

A primary object of this invention is to provide an improved form of stock watering trough whose arrangement of component parts is such as to prevent freezing of water disposed within the trough.

Another object of this invention is to provide an improved form of stock watering trough which incorporates a heating chamber in its bottom portion which will utilize the heat obtained from a continuous flow of water therethrough to prevent water disposed in the trough above the chamber from freezing.

Another object of this invention is to provide a stock watering trough with improved valve means.

Another object of this invention is to provide an improved form of stock watering trough which incorporates deflector means in its construction to effectively prevent the formation of ice in the trough.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the improved stock watering trough;

Figure 4 is a vertical section taken substantially along the plane of section line 4—4 of Figure 3 showing further details of the valve mechanism on an enlarged scale;

Figure 5 is a fragmentary transverse section showing a portion of the trough and the valve assembly.

Figure 2:
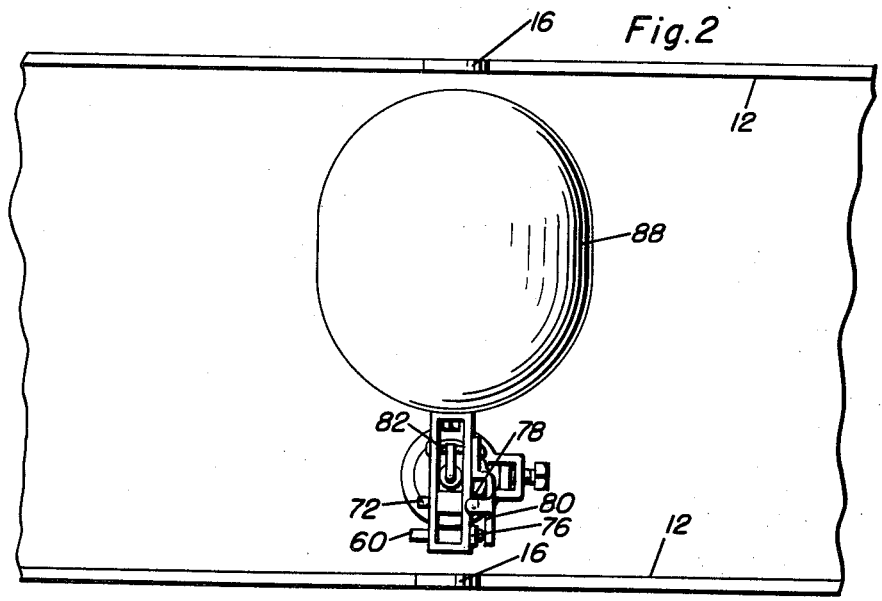
Figure 2 is an enlarged plan view of a portion of the watering trough showing the cover removed.

Referring now more particularly to Figure 1, reference numeral 10 indicates the continuous side wall of the trough assembly which is generally of elongated configuration but, of course, may take any desired shape or form. The opposed side walls 12 and 14 are provided with a pair of upstanding bracket ears 16 which receive a retaining pin 18 therebetween. An arcuate cover plate 20 provided with depending deflector plate portions 22 and end wall portions 24 is disposed between the opposed side walls 12 and 14 between the brackets 16 and this cover is retained in its proper position by means of the retaining pin 18. In this respect, it will be noted that the top portion 20 overhangs the top edges of the opposed side walls as at 26 and at appropriate portions of the end walls 24 and the arcuate top 20 are cut away to provide clearance for the bracket ears 16. Thus, the cover assembly is rigidly maintained in proper position with the lower edges of the deflector plates 22 spaced slightly from the partition wall member 28.

Figure 3:
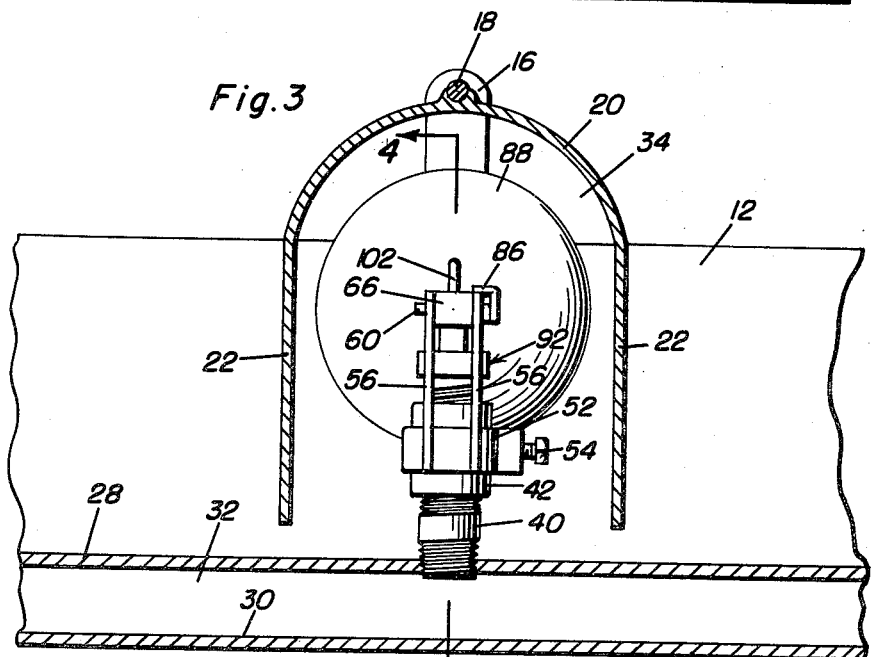
Figure 3 is a longitudinal section taken through the trough showing details of the valve construction on enlarged scale.

Referring now more particularly to Figure 3, it will be seen that the trough assembly is provided with a bottom wall 30 which is spaced slightly below the partition wall member 28 so as to present a chamber 32 below the partition wall which is separated from the main portion of the trough assembly above this wall. The cover member, when in place, provides a float chamber 34.

The opposite ends of the trough are provided with an inlet line 36 and an outlet line 38 which establish a continuous flow of water through the chamber 32, it being appreciated that this particular trough mechanism is particularly adapted for use in conjunction with artesian wells or other sources of continuously flowing water. The purpose of providing a continuous flow through the chamber 32 is to allow the relatively quiescent water which is disposed in the main portion of the trough to absorb heat from the continuously flowing water, which continuously flowing water will vary very little in temperature throughout a seasonal year. In this manner, the water disposed in the main portion of the trough assembly will be maintained at sufficiently high temperature to prevent its freezing no matter what the ambient temperature conditions.

Figure 6:
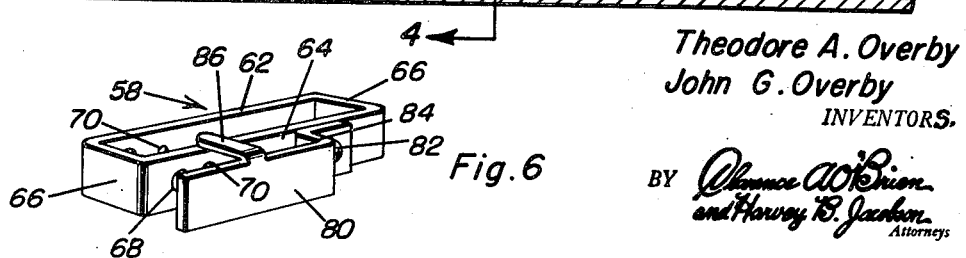
Figure 6 is a perspective view of the float valve actuating lever and its pin retaining means.

The partition wall 28 is provided with an opening suitably threaded for the reception for the pipe nipple member 40 whose upper end is provided with the union member 42 having the valve seat member 44 provided at its upper end. The valve seat member is provided with a vertical bore 46 the lower portion of which is countersunk as at 48 and provided with an annular seat member 50 as seen most clearly in Figure 4. A bracket collar 52 is adjustably secured by the setscrew fastener 54 to the outer surface of the union member 42 and a pair of spaced bracket legs 56 extend upwardly from the member 52 and pivotally receive therebetween the actuating lever assembly 58 by means of the pivot pin 60. The actuating lever assembly is of open rectangular construction and is provided with the opposed side members 62 and 64 interconnected by the end members 66, the side walls being provided with registered apertures 68 and 70 the former of which adapted to receive the pivot pin 60. The other set of apertures receive the locking pin 72 so that the valve lifter block 74 is carried thereby between the walls 62 and 64. Both the pins 60 and 72 are provided with enlarged collar portions 76 and 78 respectively to prevent removal of the pins in one direction through the actuating lever assembly and for normally preventing displacement of these pins in the other direction, a retaining plate 80 is pivotally secured by the fastener 82 on the side wall 64. The main portion of the plate is displaced laterally of the side wall with which it is associated, the pivoted end portion of the plate being laterally offset as at 84 for this purpose. The top portion of the retaining plate is provided with a laterally bent ear 86 which prevents downward pivotal motion of the retaining plate beyond the position shown in Figure 6. When in the position shown, the retaining plate will prevent displacement of the pins 60 and 72 from the actuating lever assembly while these pins may be rapidly and easily removed therefrom when the plate is swung upardly, as will be readily apparent.

The free end of the actuating lever is provide with the hollow float body 88 which is suitably secured thereto as by the fastener 90 so that the actuating lever oscillates in a vertical plane in response to the level of the water in the main portion of the watering trough.

The valve lifter block 74 is provided at its lower free end portion with a deflector cap 92 whose central portion 94 is provided with a threaded bore 96 and whose depending flange portion 98 encircles or encompasses the member 44 to prevent undue splashing and spraying of the water emanating through the longitudinal bore 46 in the member 44. A resilient cushion member 100 may be provided on the undersurface of the cover 92. The threaded bore 96 receives the L-shaped valve stem whose main shank portion 102 is threaded throughout a substantial extent of its lower portion and threadedly receives the ball valve 104 at its extreme lower end, which valve is movable with the actuating mechanism to engage and disengage with the seat 50. The upper end of the valve stem is laterally bent to provide a manually actuated lever portion 106 through which the valve stem and the valve may be manually adjusted to the desired position.

In operation, the continuously flowing water passing through the chamber 32 will transfer some of its heat to the water disposed in the upper portion of the trough assembly and, when the cover 20 is in place to present the chamber 34 for the float assembly, this chamber will establish the desired distribution of water that flows from the float valve mechanism to replenish the supply in the main portion of the trough. When water flows from the float valve mechanism, the same will tend to fill the chamber 34 and being distributed throughout the remainder of the trough by flowing beneath the lower edges of the side deflector plates 22. In this manner, the deflector plates effect an even distribution of the water throughout the trough inasmuch as the relatively slight spacing between the lower edge of the plates and the partition wall 28 will tend to force the water flowing from the chamber 34 along the partition wall 28 so as to not only stir up the rather warm layer of water disposed there but will also tend to produce a swirling action of the entering water which will thoroughly mix with the remaining water in the trough, thus most effectively preventing its freezing.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A watering trough comprising a container having a bottom and side walls, a horizontal partition wall spaced from said bottom and forming a heating chamber therewith, said chamber having inlet and outlet openings for connection with a continuously flowing source of water, valve means communicating said chamber with the main portion of said trough above said partition, said valve means being responsive to the level of water in said main portion.

2. The combination of claim 1 wherein deflector walls are provided at opposite sides of said valve means, and a cover is provided over said valve means.

3. The combination of claim 1 wherein said valve means includes a valve seat, an actuating lever pivotally secured at one end to said trough and carrying a float member at its other end, and a valve body carried by said lever and engageable with said seat.

4. The combination of claim 1 wherein deflector walls are provided at opposite sides of said valve means, and a cover is provided over said valve means, said deflector walls having lower edges spaced from said partition.

5. In combination with an elongated watering trough having a bottom and provided with side walls to form a water container, a partition wall extending horizontally in said container in spaced relation to said bottom to provide a chamber therewith separated from the remainder of the container above said partition, an inlet line communicating said chamber with the remainder of the container, valve means in said line responsive to water level in said container, deflector plates extending between opposed side walls of the container and disposed in enclosing relation to said valve means, said plates having their lower edges disposed in spaced relation to said partition, and means for allowing a continuous flow of water through said chamber.

6. The combination of claim 5 wherein said valve means includes a valve seat, an actuating lever pivotally secured at one end to said trough and carrying a float member at its other end, and a valve body carried by said lever and engageable with said seat.

References Cited in the file of this patent

UNITED STATES PATENTS

| Number | Name | Date |
|---|---|---|
| 243,501 | Brown | June 28, 1881 |
| 369,132 | Speight | Aug. 30, 1887 |
| 449,321 | Hansen | Mar. 31, 1891 |
| 1,148,778 | Jackson | Aug. 3, 1915 |
| 1,246,786 | Rodney | Nov. 13, 1917 |
| 1,792,199 | Tallyn | Feb. 10, 1931 |

FOREIGN PATENTS

| Number | Country | Date |
|---|---|---|
| 221,047 | Germany | Apr. 19, 1910 |